United States Patent
Tsuji et al.

(10) Patent No.: US 11,315,528 B2
(45) Date of Patent: *Apr. 26, 2022

(54) IMAGE DISPLAY SYSTEM, IMAGE DISPLAY METHOD, MOVABLE OBJECT INCLUDING THE IMAGE DISPLAY SYSTEM, AND NON-TRANSITORY COMPUTER-READABLE MEDIUM

(71) Applicant: PANASONIC INTELLECTUAL PROPERTY MANAGEMENT CO., LTD., Osaka (JP)

(72) Inventors: Masanaga Tsuji, Osaka (JP); Toshiya Mori, Osaka (JP); Ken'ichi Kasazumi, Osaka (JP); Yoshiteru Mino, Osaka (JP); Tadashi Shibata, Osaka (JP); Nobuyuki Nakano, Osaka (JP); Akira Tanaka, Osaka (JP); Shohei Hayashi, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/230,556

(22) Filed: Apr. 14, 2021

(65) Prior Publication Data
US 2021/0233499 A1    Jul. 29, 2021

Related U.S. Application Data

(63) Continuation of application No. 16/354,820, filed on Mar. 15, 2019, now Pat. No. 11,004,424.

(30) Foreign Application Priority Data

Mar. 20, 2018    (JP) .............................. JP2018-053557

(51) Int. Cl.
*G09G 5/37*    (2006.01)
*G09G 5/00*    (2006.01)
(Continued)

(52) U.S. Cl.
CPC ............... *G09G 5/37* (2013.01); *B60K 35/00* (2013.01); *G02B 27/0101* (2013.01);
(Continued)

(58) Field of Classification Search
None
See application file for complete search history.

(56) References Cited

U.S. PATENT DOCUMENTS

2010/0073773 A1    3/2010    Hotta et al.
2017/0225621 A1    8/2017    Shiohara
(Continued)

FOREIGN PATENT DOCUMENTS

CN    104253990 A    12/2014
JP    2010-076533 A    4/2010
(Continued)

OTHER PUBLICATIONS

Japanese Office Action issued in Japanese Counterpart Patent Appl. No. 2018-053557, dated Sep. 8, 2020, along with an English translation thereof.
(Continued)

*Primary Examiner* — Michelle Chin
(74) *Attorney, Agent, or Firm* — Greenblum & Bernstein, P.L.C.

(57) ABSTRACT

An image display system includes a display unit displaying an image, a projection unit projecting in a target space a virtual image corresponding to the image with an output light of the display unit, a body unit provided thereto the display unit and the projection unit, and an image producing unit including a first correction unit and a second correction
(Continued)

unit. The first correction unit performs a first correction processing of correcting, based on a first orientation signal indicative of a first orientation change of the body unit, a display position of the virtual image in the target space. The second correction unit performs a second correction processing of correcting, based on a second orientation signal indicative of a second orientation change of the body unit which is faster than the first orientation change, the display position of the virtual image in the target space.

19 Claims, 9 Drawing Sheets

(51) Int. Cl.
  *G06T 19/00* (2011.01)
  *G06T 5/00* (2006.01)
  *G08G 1/0967* (2006.01)
  *G02B 27/01* (2006.01)
  *B60K 35/00* (2006.01)

(52) U.S. Cl.
  CPC .......... *G02B 27/0179* (2013.01); *G06T 5/006* (2013.01); *G06T 19/006* (2013.01); *G08G 1/0967* (2013.01); *G09G 5/003* (2013.01); *B60K 2370/1531* (2019.05); *B60K 2370/186* (2019.05); *G02B 2027/011* (2013.01); *G02B 2027/0112* (2013.01); *G02B 2027/0141* (2013.01); *G02B 2027/0183* (2013.01); *G09G 2340/0464* (2013.01); *G09G 2340/0492* (2013.01); *G09G 2340/12* (2013.01); *G09G 2360/18* (2013.01); *G09G 2380/10* (2013.01)

(56) References Cited

U.S. PATENT DOCUMENTS

| | | |
|---|---|---|
| 2019/0139286 A1 | 5/2019 | Shimoda |
| 2020/0269696 A1 | 8/2020 | Banno et al. |

FOREIGN PATENT DOCUMENTS

| | | |
|---|---|---|
| JP | 2017-013590 | 1/2017 |
| JP | 2017-016455 A | 1/2017 |
| JP | 2019-98755 A | 6/2019 |
| WO | 2017/134861 A1 | 8/2017 |

OTHER PUBLICATIONS

Japanese Office Action issued in Japanese Application No. 2018-053557, dated Dec. 15, 2020, along with English translation.
Chinese Office Action issued in Chinese Counterpart Patent Appl. No. 201910208006.0, dated Mar. 12, 2021, along with an English translation thereof.

IMAGE DISPLAY SYSTEM, IMAGE DISPLAY METHOD, MOVABLE OBJECT INCLUDING THE IMAGE DISPLAY SYSTEM, AND NON-TRANSITORY COMPUTER-READABLE MEDIUM

CROSS-REFERENCE TO RELATED APPLICATIONS

The present application is a continuation of U.S. patent application Ser. No. 16/354,820, filed Mar. 15, 2019, which claims the benefit of Japanese Patent Application No. 2018-053557, filed Mar. 20, 2018. The disclosure of each of the above-noted applications is expressly incorporated herein by reference in its entirety.

TECHNICAL FIELD

The present disclosure relates generally to image display systems, image display methods, movable objects including the image display systems and non-transitory computer-readable mediums, and more particularly, to an image display system for projecting a virtual image in a target space, an image display method, a movable object including the image display system, and a non-transitory computer-readable medium.

BACKGROUND ART

Document 1 (JP2017-13590A) discloses a head-up display device which is an example of an image display system projecting a virtual image in a target space. This head-up display device includes an indicator for outputting a display light, and is configured to emit the display light to a front window of a vehicle to allow a user to visually perceive a virtual image of a display image of the indicator as if it is superimposed on a real scene in front of the vehicle.

The head-up display device includes a vehicle vibration input unit and a display control unit. The vehicle vibration input unit is configured to receive vibration information of the vehicle (i.e., orientation information of the vehicle). The display control unit is configured to correct the display image based on the vibration information to correct a display position of the virtual image. Specifically, the display control unit draws the display image on a first layer, and then moves a display position of the display image drawn on the first layer in a direction so as to compensate the vibration of the vehicle. The first layer is a virtual plane and is defined in association with a display surface of the indicator. As a result, the positional relation between the display position of the virtual image and a target object existing in the real scene can be maintained regardless of the vibration of the vehicle.

In the above head-up display device, the display position of the display image is corrected based on the vibration information during a drawing processing of drawing the display image. In this configuration, the display unit is subject to have a display delay (for example, a delay about several frames). Furthermore, when the correction includes a displacement of the display position of the display image, the display image may be partially out of range of the display surface by the displacement (to cause an image defect). In order to prevent such an image defect, a drawable area of the display image in which the display image is allowed to be drawn should be restricted to a comparatively narrow area.

SUMMARY

The present disclosure provides an image display system, an image display method, a movable object including the image display system, and a non-transitory computer-readable medium, which are capable of reducing a display delay of a display image and a drawable area of the display image of which is less likely to be restricted.

An image display system according to an aspect of the present disclosure includes an image producing unit, a display unit, a projection unit, and a body unit. The image producing unit is configured to produce an image. The display unit is configured to display the image produced by the image producing unit. The projection unit is configured to project, in a target space, a virtual image corresponding to the image with an output light of the display unit. The display unit and the projection unit are provided to the body unit. The image producing unit includes a first correction unit and a second correction unit. The first correction unit is configured to perform a first correction processing of correcting, based on a first orientation signal, a display position of the virtual image in the target space. The first orientation signal is indicative of a first orientation change of the body unit. The second correction unit is configured to perform a second correction processing of correcting, based on a second orientation signal, the display position of the virtual image in the target space. The second orientation signal is indicative of a second orientation change of the body unit. A change rate of the second orientation change is faster than that of the first orientation change. The second correction unit is configured to perform the second correction processing at a timing different from a timing at which the first correction unit performs the first correction processing.

A movable object according to an aspect of the present disclosure includes the image display system and a movable object body. The image display system is installed in the movable object body.

An image display method according to an aspect of the present disclosure is an image display method employing an image display system including a display unit, a projection unit, and a body unit. The image display unit is configured to display an image. The projection unit is configured to project, in a target space, a virtual image corresponding to the image with an output light of the display unit. The display unit and the projection unit are provided to the body unit. The image display method includes an image producing processing of producing the image displayed on the display unit. The image producing processing includes a first correction processing and a second correction processing. The first correction processing is a processing of correcting, based on a first orientation signal, a display position of the virtual image in the target space. The first orientation signal is indicative of a first orientation change of the body unit. The second correction processing is a processing of correcting, based on a second orientation signal, the display position of the virtual image in the target space. The second orientation signal is indicative of a second orientation change of the body unit change rate of the second orientation change is faster than that of the first orientation change. The image display method performs the first correction processing and the second correction processing at different timings.

A non-transitory computer-readable medium according to an aspect of the present disclosure records a computer program for instructing a computer system to execute the above image display method.

DETAILED DESCRIPTION (1) Overview

Figure 1:
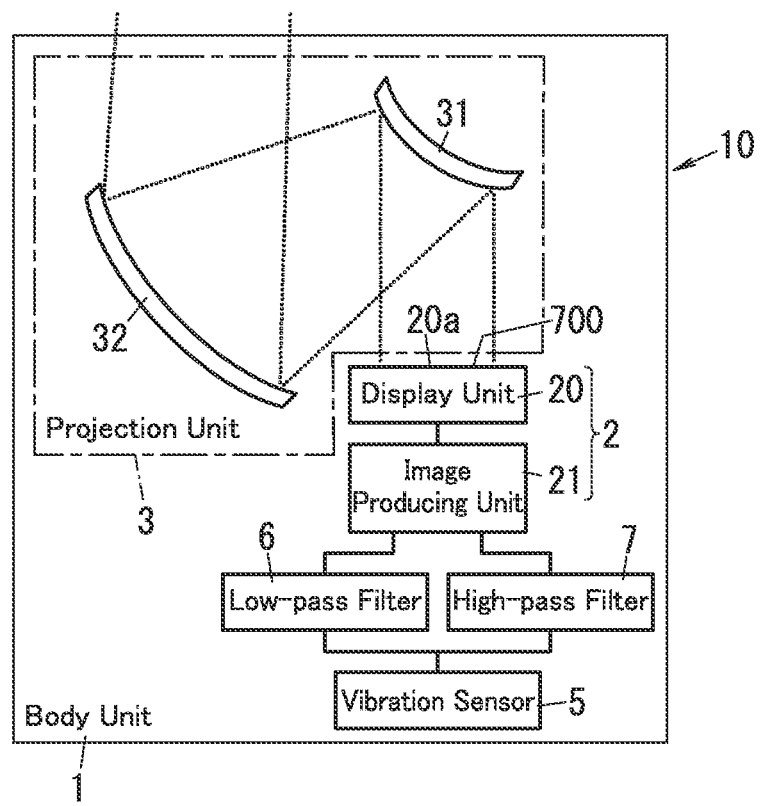
FIG. 1 is a conceptual view illustrating a configuration of an image display system of one embodiment.
Figure 2:
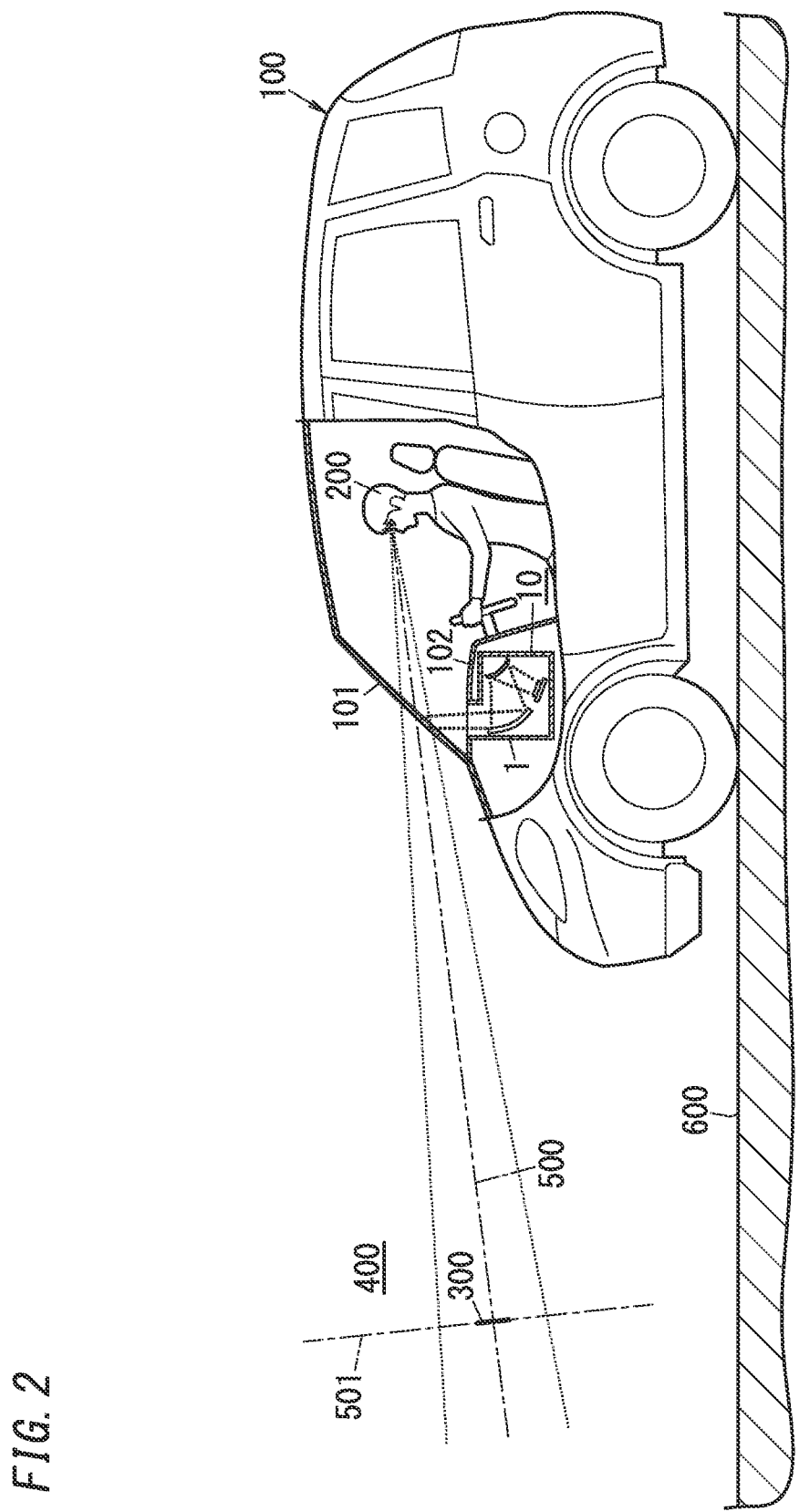
FIG. 2 is a conceptual view of an automobile including the image display system.

As shown in FIG. 1 and FIG. 2, an image display system 10 according to the present embodiment is a Head-Up Display (HUD), and may be installed in an automobile 100 which is an example of a movable object body, for example. According to the present embodiment, a movable object is defined as a whole object including the image display system 10 and the automobile 100 (movable object body) in which the image display system 10 is installed.

The image display system 10 is installed in an interior of the automobile 100 to project an image onto a windshield 101 of the automobile 100 from below. In an example shown in FIG. 2, the image display system 10 is placed inside a dashboard 102 below the windshield 101. When an image is projected from the image display system 10 onto the windshield 101, a user (driver) 200 can visually perceive the image projected onto the windshield 101 as a virtual image 300 that is formed in a target space 400 in front of (outside) the automobile 100.

In this disclosure, a "virtual image" means an image which is formed by diffused rays of light caused when imaging light emitted from the image display system 10 is diffused by a reflective member such as the windshield 101 and appears as if a real object. The windshield 101 is a target of projection onto which an image 700 is to be projected.

Figure 3:
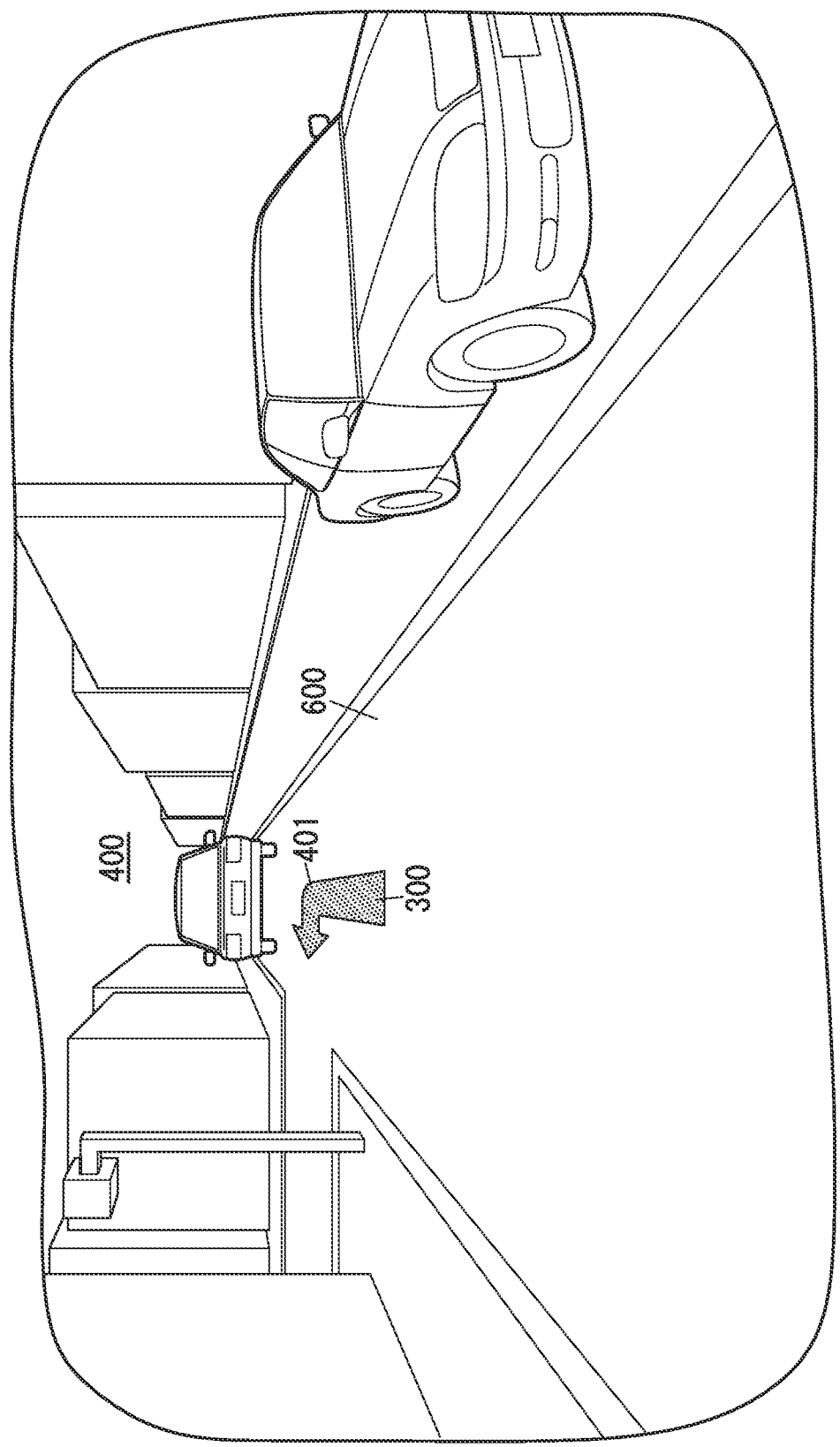
FIG. 3 is a conceptual view of a field of view of a driver using the display system.

Therefore, as shown in FIG. 3, the user 200 driving the automobile 100 can see the virtual image 300 which is formed by the image display system 10 and overlaps with a real scene spreading in front of the automobile 100. Accordingly, the image display system 10 can present various kinds of driving assist information in a form of the virtual image 300 overlaid on the real scene to allow the user 200 to visually perceive the information. Examples of the driving assist information include vehicle speed information, navigation information, pedestrian information, forward vehicle information, lane departure information, and vehicle condition information. Accordingly, when the user 200 trains his or her eyes on a space in front of the windshield 101, the user 200 can visually obtain the driving assist information by slight movement of a line of his or her sight.

For example, the virtual image 300 displayed in the target space 400 can present the navigation information indicating a traveling direction of the automobile 100, and can be displayed as an arrow indicating a right-turn or left-turn as if it is drawn on a road surface 600. Such a kind of virtual image 300 is displayed by use of the Augmented Reality (AR) techniques, and is overlaid on a specific position in the real scene (road surface 600, building, surrounding vehicle, pedestrian, and the like) in a field of view of the user 200.

The virtual image 300 displayed in the target space 400 is present within an imaginary surface 501 across an optical axis 500 of the image display system 10. The optical axis 500 extends along a road surface 600 in front of the automobile 100 in the target space 400 in front of the automobile 100. The imaginary surface 501 where the virtual image 300 is created is almost perpendicular to the road surface 600. For example, when the road surface 600 is a horizontal surface, the virtual image 310 may be seen as if it extends along a vertical surface.

As shown in FIG. 1, the image display system 10 includes an image display unit 2, a projection unit 3, and a body unit 1. The image display unit 2 includes a display surface 20a, and is configured to display the image 700 on the display surface 20a. The projection unit 3 is configured to perform a projection processing of projecting the virtual image 300 (see FIG. 2) corresponding to the image 700 toward the target space 400 (see FIG. 2) with the output light of the image display unit 2. The image display unit 2 and the projection unit 3 are provided to the body unit 1.

The body unit 1 is installed in the automobile 100. When an orientation (posture) of the automobile 100 changes due to, for example, a condition of the road surface 600, acceleration/deceleration of the automobile 100, and the like, an orientation of the body unit 1 also occurs according to the orientation change of the automobile 100. Specifically, when the automobile 100 is decelerated, the automobile 100 inclines forward, leading to a forward inclination of the body unit 1. When the automobile 100 is accelerated, the automobile 100 inclines rearward, leading to a backward inclination of the body unit 1. Change in the orientation of the body unit 1 of the image display system 10 causes a change in the positional relation between the virtual image 300 and the real scene (objects in the real scene). Accordingly, the orientation change of the body unit 1 causes the virtual image 300 to be displayed at a position which is displaced (misaligned) from the specific position originally desired to be displayed, in the real scene of the field of view of the user 200, for example.

Figure 4:
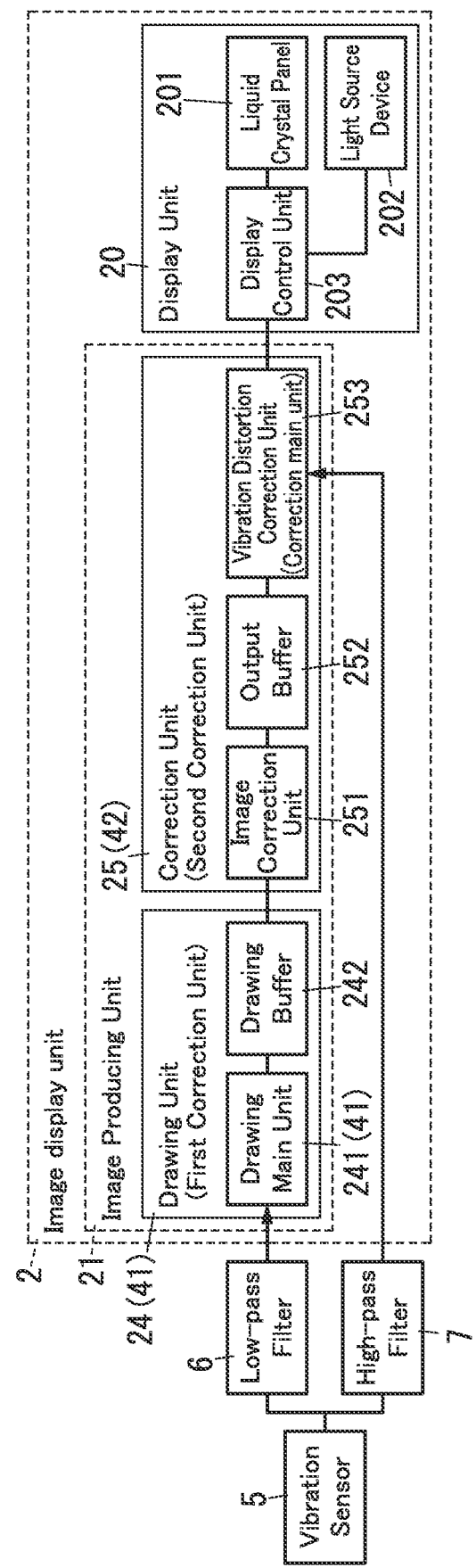
FIG. 4 is a block diagram illustrating a configuration of an image display unit of the image display system.

In view of such circumstances, as shown in FIG. 4, the image display system 10 includes a first correction unit 41 and a second correction unit 42 configured to correct (adjust) the display position of the virtual image 300 in the target space 400 in response to the orientation change of the body unit 1 so that the virtual image 300 can be displayed at the specific position originally desired in the real scene. The first correction unit (first adjusting unit) 41 is configured to perform a first correction processing (first adjusting processing) of correcting (adjusting) the display position of the virtual image 300 in the target space 400 according to a first orientation change of the body unit 1. The second correction unit (second adjusting unit) 42 is configured to perform a second correction processing (second adjusting processing) of correcting (adjusting) the display position of the virtual image 300 in the target space 400 according to a second orientation change of the body unit 1. The second correction unit 42 performs the second correction processing at a timing different from a timing at which the first correction unit 41 performs the first correction processing. A change rate of the second orientation change is faster than that of the first orientation change.

The first orientation change is a kind of orientation change of the body unit 1 of which change rate is comparatively slow. Specifically; the first orientation change is a vibration (orientation change) of which frequency is lower than a first frequency. In other words, the first orientation change is a kind of orientation change of the body unit 1 of which frequency of occurrence is smaller than a first threshold. In yet other words, the first orientation change is a kind of orientation change of the body unit 1 that an orientation (posture) of the body unit 1 after the orientation change is maintained for a certain length of time. The first orientation change may occur by the acceleration/deceleration of the automobile 100, for example.

The second orientation change is a kind of orientation change of the body unit 1 of which change rate is comparatively fast. Comparing the second orientation change and the first orientation change, the change rate of the second orientation change is faster than that of the first orientation change. Specifically, the second orientation change is a vibration (orientation change) of the body unit 1 of which frequency is equal to or higher than a second frequency in other words, the second orientation change is a kind of orientation change of the body unit 1 of which frequency of occurrence is larger than or equal to a second threshold. In yet other words, the second orientation change is a kind of orientation change of the body unit 1 that the orientation (posture) of the body unit 1 changes with time. The second orientation change may occur, for example, by an up-down movement of the automobile 100 as a result of the automobile 100 running on a bumpy road. The first frequency and the second frequency may be the same as or different from each other. The first threshold and the second threshold may be the same as or different from each other, as well.

With this configuration, the display position of the virtual image 300 can be corrected (adjusted) in response to the orientation change of the body unit 1. As a result of which, even when the automobile 100 has the first orientation change or the second orientation change, the image display system 10 can display the virtual image 300 overlaid on the specific position originally desired to be displayed in the real scene in the field of view of the user 200.

Furthermore, according to the image display system 10, the first correction unit 41 and the second correction unit 42 work alternatively according to the kinds of the orientation change of the automobile 100 (first orientation change or second orientation change). The body unit 1 possibly has various kinds of orientation change along with the orientation change of the automobile 100, but, according to the image display system 10, it is possible to correct the display position of the virtual image 300 at an adequate processing stage among several processing stages performed by the image display unit 2, depending on the kind of the orientation change (whether it is the first orientation change or the second orientation change) actually occurring in the body unit 1.

A correction processing of the display position of the virtual image 300 addressing the second orientation change may be require to be performed in real time, and thus may be performed at a processing stage which processes in a real-time basis, for example. A correction processing of the display position of the virtual image 300 addressing the first orientation change may not be necessarily performed in real time, and thus may be performed at a processing stage in which a drawable area of the image 700 is less likely to be restricted by the correction processing. Accordingly, it is possible to correct the display position of the virtual image 300 according to the orientation change of the body unit 1, while a display delay of the virtual image 300 can be reduced and a drawable area of the image 700 corresponding to the virtual image 300 is less likely to be restricted.

(2) Details

As shown in FIG. 1, the image display system 10 includes the body unit 1, the image display unit 2, the projection unit 3, a vibration sensor 5, a low-pass filter 6, and a high-pass filter 7. The vibration sensor 5 and the low-pass filter 6 cooperate to function as a first detector configured to detect the first orientation change of the body unit 1 to output a first orientation signal indicative of the detected first orientation change. The vibration sensor 5 and the high-pass filter 7 cooperate to function as a second detector configured to detect the second orientation change of the body unit 1 to output a second orientation signal indicative of the detected second orientation change.

The body unit 1 includes a housing, for example. The image display unit 2, the projection unit 3, the vibration sensor 5, the low-pass filter 6, and the high-pass filter 7 are housed in (mounted on) the body unit 1. As shown in FIG. 2, the body unit 1 is fixed to an interior of the dashboard 102 of the automobile 100. Alternatively, the body unit 1 may include a frame or a plate member, in place of the housing. The image display unit 2 includes a display unit 20 and an image producing unit 21 (described later). Out of the display unit 20 and the image producing unit 21, the image producing unit 21 may not be provided to the body unit 1.

The vibration sensor 5 includes a sensor configured to detector a vibration acting on the body unit 1, and to detect the vibration of the body unit 1 to detect the first orientation change and the second orientation change of the body unit 1. The vibration on the body unit 1 includes a first vibration having a frequency lower than the first frequency (corresponding to information on the first orientation change) and a second vibration having a frequency higher than or equal to the second frequency (corresponding to information on the second orientation change). The body unit 1 is fixed to the automobile 100, and thus the vibration acting on the body unit 1 is substantially the same as the vibration acting on the automobile 100. That is, the vibration sensor 5 is configured to detect the vibration acting on the automobile 100 and to thereby detect the vibration acting on the body unit 1. The vibration sensor 5 is configured to detect a change in an angle of pitch of the automobile 100 caused by the vibration on the automobile 100. The vibration sensor 5 is configured to output a signal indicative of the detected vibration, to the low-pass filter 6 and the high-pass filter 7.

Receiving the signal from the vibration sensor 5, the low-pass filter 6 allows a signal component having a frequency lower than the first frequency (namely, a signal indicative of the first orientation change) to pass therethrough, and cuts off a signal component having a frequency higher than or equal to the first frequency. The low-pass filter 6 outputs, as the first orientation signal, the signal (signal component) that passes through the low-pass filter 6. Receiving the signal from the vibration sensor 5, the high-pass filter 7 allows a signal component having a frequency higher than or equal to the second frequency (namely, a signal indicative of the second orientation change) to pass therethrough, and cuts off a signal component having a frequency lower than the second frequency. The high-pass filter 7 outputs, as the second orientation signal, the signal (signal component) that passes through the high-pass filter 7. The first orientation signal is indicative of the first orientation change of the body unit 1. The second orientation signal is indicative of the second orientation change of the body unit 1. The vibration sensor 5 may be a gyro-sensor (angular velocity sensor), for example. However, the vibration sensor 5 is not limited to the gyro-sensor. The vibration sensor 5 may be an acceleration sensor, for example.

The image display unit 2 has the display surface 20a, and is configured to display the image 700 on the display surface 20a to emit rays of light constituting the displayed image 700 toward the projection unit 3. As shown in FIG. 1, the image display unit 2 includes the display unit 20 and the image producing unit 21. The display unit 20 is configured to perform a display processing of displaying the image 700 to emit the rays of light constituting the displayed image 700 forward of the display unit 20. The image producing unit 21 is configured to perform an image producing processing of producing the image 700 to be displayed on the display unit 20. In the present embodiment, the image 700 includes an arrow for guiding a traveling route to a destination of the automobile 100, which is displayed as if it is on a road surface for the automobile 100. Hereinafter, the image 700 may be referred to as an arrow image 700. The virtual image 300 also includes an image representing an arrow (see FIG. 3).

Specifically, the image producing unit 21 is configured to acquire the navigation information from a navigation device installed in the automobile 100. The navigation information may include a traveling route to the destination of the automobile 100, a distance from the automobile 100 to a nearest intersection, and the like, for example. In an example, when determining that the automobile 100 reaches a location, which is a certain distance away from a nearest intersection in the traveling route, based on the acquired navigation information, the image producing unit 21 produces the arrow image 700 for guiding the traveling direction in the intersection. In this instance, the arrow image 700 is displayed so that the virtual image 300 is displayed at a predetermined position (for example, a position where the arrow overlaps with the road in the intersection) 401 in the target space 400. The image producing unit 21 then outputs the produced arrow image 700 to the display unit 20. Accordingly, the virtual image 300 corresponding to the arrow image 700 is displayed at the predetermined position (for example, the position where the arrow overlaps with the road in the intersection) 401 in the target space 400, provided that no orientation change occurs in the body unit 1.

The image producing unit 21 is configured to receive the first orientation signal from the low-pass filter 6 and the second orientation signal from the high-pass filter 7, respectively, to acquire orientation information about the first orientation change and the second orientation change of the body unit 1. When the body unit 1 has an orientation change, the positional relation between the virtual image 300 and the real scene (objects in the real scene) changes, leading to a misalignment (displacement) of the virtual image 300 with respect to a specific position (for example, the intersection) originally desired to be displayed in the target space 400 in the real scene. For example, the backward inclination of the automobile 100 causes the line of the user's 200 sight to move upward, and thus the real scene recognized by the user 200 moves relatively downward. As a result, the virtual image 300 is displayed in the target space 400 at a position above the intersection. In view of this circumference, the image producing unit 21 corrects, based on the acquired orientation information, the display position of the image 700 in the display surface 20a so that the display position of the virtual image 300 in the target space 400 is displaced from the predetermined position 401 to a position where the arrow overlaps with the road in the intersection.

The projection unit 3 is configured to project the virtual image 300 corresponding to the image 700 toward the target space 400 with an output light of the display surface 20a of the image display unit 2. In the present embodiment, the image display system 10 functions as a head-up display as described above, and the projection unit 3 is configured to project the image 700 onto the windshield 101 (see FIG. 2).

As shown in FIG. 1, the projection unit 3 includes a first mirror 31 and a second mirror 32. The first mirror 31 and the second mirror 32 are disposed along an optical path of the output light of the image display unit 2, in an order of the image display unit 2, the first mirror 31, and the second mirror 32. Specifically, the first mirror 31 is placed above the display surface 20a of the image display unit 2 to receive the output light of the image display unit 2. The first mirror 31 reflects the output light of the image display unit 2 toward the second mirror 32. The second mirror 32 is placed at a position where the light output from the image display unit 2 and reflected by the first mirror 31 can reach (for example, at a position front and lower side with respect to the first mirror 31). The second mirror 32 reflects upward (i.e., toward the windshield 101) the light output from the image display unit 2 and reflected by the first mirror 31. For example, the first mirror 31 may be a convex mirror. The second mirror 32 may be a concave mirror.

With this configuration, the projection unit 3 can appropriately enlarged or minified the image 700 displayed on the display surface 20a of the image display unit 2 to form a projection image projected onto the windshield 101. Accordingly, the virtual image 300 is displayed in the target space 400. In the field of view of the user 200 driving the automobile 100, the virtual image 300 corresponding to the image 700 and projected by the image display system 10 is present with the virtual image 300 overlapped with the real scene spreading in front of the automobile 100.

The image producing unit 21 and the display unit 20 will be explained in detail with reference to FIG. 4.

As shown in FIG. 4, the image producing unit 21 includes a drawing unit 24 and a correction unit (adjustment unit) 25. The drawing unit 24 is configured to perform a drawing processing of drawing the image 700 (see FIG. 1) to be displayed on the display unit 20. The drawing unit 24 includes a drawing main unit 241 and a drawing buffer 242. The drawing main unit 241 is configured to produce the image 700. The drawing buffer 242 is configured to temporarily store the image 700 drawn by the drawing main unit 241 and to output it to the correction unit 25. The correction unit 25 is configured to perform a correction processing on the image 700 drawn by the drawing unit 24 to perform various corrections, and to output to the display unit 20 the image 700 subject to the correction processing.

In the present embodiment, the drawing main unit 241 draws the image (arrow image) 700 for guiding the traveling direction in the intersection, based on the navigation information acquired by the image producing unit 21, as described above.

The drawing main unit 241 is further configured to correct (adjust) the image 700 based on the first orientation signal from the low-pass filter 6 to compensate the misalignment of the virtual image 300 with respect to the real scene, which is caused by the first orientation change of the body unit 1.

The correction processing (first correction processing) is performed on the image 700 during the drawing processing of the image 700. Specifically, the drawing main unit 241 is configured to, when determining that the first orientation change occurs in the body unit 1 based on the first orientation signal from the low-pass filter 6, correct the image 700 by drawing the image 700 so that the misalignment of the virtual image 300 with respect to the real scene caused by the first orientation change of the body unit 1 is compensated. Accordingly, even when the first orientation change occurs in the body unit 1, the virtual image 300 can be displayed in the target space 400 at the specific position originally desired to be displayed in the real scene (for example, the position where the arrow overlaps with the road in the intersection) in the field of view of the user 200.

As described above, the drawing main unit 241 is configured to perform, on the image 700, the correction processing (first correction processing) for correcting the display position of the virtual image 300 based on the first orientation signal, in response to the first orientation change of the body unit 1. In the present embodiment, the drawing main unit 241 (namely, the drawing unit 24) serves as (includes) the first correction unit 41 configured to correct the display position of the virtual image 300 in response to the first orientation change of the body unit 1.

Specifically, the drawing main unit 241 is configured to render, in a three-dimensional virtual space corresponding to the target space 400, a three-dimensional image corresponding to the image 700, and to project the rendered three-dimensional image onto a projection plane in the three-dimensional virtual space to form a two-dimensional image serving as the image 700, and to thereby draw the image 700. The drawing main unit 241 is further configured to correct the image while drawing the image 700 by correcting a position and/or an angle of the three-dimensional image while rendering the three-dimensional image in the three-dimensional virtual space.

As described above, the correction processing of correcting the display position of the virtual image 300 addressing the first orientation change of the body unit 1 (which is the correction processing not necessarily to be performed in real time) is performed during the drawing processing of the image 700. This can reduce a possibility that the image 700 is displayed on the display surface 20*a* with the image 700 partially out of range of the display surface 20*a* (image defect). That is, this is addressed to reduce the possibility of the image defect rather than the real time drawability. As a result, the drawable area of the image 700 is less likely to be restricted.

As shown in FIG. 4, the correction 25 includes an image correction unit 251, an output buffer 252 (buffer), and a vibration distortion correction unit 253 (correction main unit).

The image correction unit 251 is configured to perform a color compensation processing on the image 700 output from the drawing buffer 242 (i.e., on the image drawn by the drawing unit 24). The color compensation processing may include a correction processing of adjusting the color of each picture unit (pixel) of the image 700. Specifically, the image correction unit 251 is configured to correct the color of each picture unit of the image 700 drawn by the drawing unit 24 so that the picture unit has a desired color. For example, when there is a picture unit whose color is defined as white but is tinged with red in the image 700 drawn by the drawing unit 24, the color of the picture unit is corrected to the white.

The image correction unit 251 is configured to output, to the output buffer 252, the image 700 subject to the color compensation.

The output buffer 252 is configured to temporarily store the image 700 output from the image correction unit 251, and to output the image 700 to the vibration distortion correction unit 253.

The vibration distortion correction unit 253 is configured to perform a vibration correction processing (second correction processing) and a distortion correction processing on the image 700 output from the output buffer 252 (i.e., on the image drawn by the drawing unit 24). The vibration distortion correction unit 253 is configured to output, to the display unit 20, the image 700 subject to the correction.

For the vibration correction processing (second correction processing), the vibration distortion correction unit 253 corrects, based on the second orientation signal from the high-pass filter, the image 700 output from the output buffer 252 to compensate the misalignment of the virtual image 300 with respect to the real scene, which is caused by the second orientation change. Specifically, the vibration distortion correction unit 253 is configured to, when determining that the vibration (namely, first orientation change) occurs in the body unit 1 based on the second orientation signal from the high-pass filter 7, correct the image 700 output from the output buffer 252 so that the misalignment of the virtual image 300 with respect to the real scene caused by the vibration of the body unit 1 is compensated. Specifically, in this correction processing, the image 700 is corrected so that the image 700 to be displayed on the display surface 20*a* is displaced toward a desired direction (so that the misalignment of the virtual image 300 with respect to the real scene caused by the vibration of the body unit 1 is compensated). That is, the vibration distortion correction unit 253 is configured to perform, on the image 700, the correction processing (second correction processing) for correcting the display position of the virtual image 300 based on the second orientation signal. In the present embodiment, the vibration distortion correction unit 253 (i.e., the correction unit 25) serves as (includes) the second correction unit 42 configured to correct the display position of the virtual image 300 in response to the second orientation change of the body unit 1.

With the vibration correction processing, even when the second orientation change occurs in the body unit 1, the virtual image 300 can be displayed in the target space 400 at the specific position originally desired to be displayed in the real scene (for example, the position where the arrow overlaps with the road in the intersection) in the field of view of the user 200. That is, the correction unit 25 serves as the second correction unit 42 configured to correct the display position of the virtual image 300 according to the second orientation change of the body unit 1.

In the distortion correction processing, the vibration distortion correction unit 253 corrects the image 700 output from the output buffer 252 so that the virtual image 300 projected onto the windshield 101 and reflected by the projection unit 3 has less distortion. In the present embodiment, the distortion correction processing is performed after the vibration correction processing. The vibration correction processing and the distortion correction processing are performed sequentially in this order.

As described above, the correction processing of correcting the display position of the virtual image 300 addressing the second orientation change of the body unit 1 (which is the correction processing required to be performed in real time) is performed at a stage later than the output buffer 252 and before the display unit 20 (namely, at the last stage of the image producing processing). It is therefore possible to perform the correction processing of correcting the display position of the virtual image 300 addressing to the second orientation change of the body unit 1 with a less display delay in the display unit 20.

The image producing processing of the image producing unit 21 for producing the image 700 includes several steps which are sequentially performed. The several steps correspond to steps of processing of: the drawing main unit 241; the drawing buffer 242; the image correction unit 251; the output buffer 252; and the vibration distortion correction unit 253, respectively. The first correction unit 41 and the second correction unit 42 perform the first correction processing and the second correction processing at different steps (a step corresponding to the processing of the drawing main unit 241 and a step corresponding to the processing of the vibration distortion correction unit 253, respectively) of the above several steps. That is, the first correction unit 41 performs the first correction processing at the step corresponding to the processing of the drawing main unit 241. On the other hand, the second correction unit 42 performs the second correction processing at the step corresponding to the processing of the vibration distortion correction unit 253. Since the first correction processing and the second correction processing are performed at different steps from each other, the first correction processing and the second correction processing can be performed at processing stages adequate for their properties (for example, whether the processing should be performed in real time or not).

The drawing unit 24 and the correction unit 25 each include a microcomputer including a Central Processing Unit (CPU) and a memory, for example. In other words, each of the drawing unit 24 and the correction unit 25 is realized by a computer (processor) including the CPU and the memory, and the computer, when the CPU executes a computer program stored in the memory, functions as the drawing unit 24 or the correction unit 25. The computer program for the drawing unit 24 is stored in the memory of the computer for the drawing unit 24 and the computer program for the correction unit 25 is stored in the memory of the computer for the correction unit 25, but at least part of them can be provided through a telecommunication network such as the Internet or a non-transitory recording medium such as a memory card.

As shown in FIG. 4, the display unit 20 includes a liquid crystal panel 201, a light source device 202, and a display control unit 203. The liquid crystal panel 201 is configured to display the image 700 produced by the image producing unit 21. The light source device 202 is configured to illuminate the image 700 displayed on the liquid crystal panel 201 to emit rays of light constituting the displayed image 700 forward of the liquid crystal panel 201. The display control unit 203 is configured to control the liquid crystal panel 201 and the light source device 202.

The liquid crystal panel 201 includes a Liquid Crystal Display (LCD), for example. The liquid crystal panel 201 is placed in front of the light source device 202. The liquid crystal panel 201 has a front surface (a surface away from the light source device 202) serving as the display surface 20a. The image 700 is displayed on the display surface 20a.

The light source device 202 serves as a backlight of the liquid crystal panel 201. An output light of the light source device 202 passes through the liquid crystal panel 201 to exit from the display surface 20a. The light source device 202 may include a solid-state light emitting device(s) such as a light emitting diode(s), a laser diode(s), and the like. The light source device 202 may be a surface light source configured to illuminate a substantially whole area of a back surface of the liquid crystal panel 201.

The display control unit 203 is configured to drive the liquid crystal panel 201 based on the image 700 output from the image producing unit 21 to the display unit 20 to make the display surface 20a display thereon the image 700. The display control unit 203 is configured to turn on the light source device 202 to illuminate the image 700 displayed on the liquid crystal panel 201 to emit rays of light constituting the image 700 forward. The rays of light emitted forward of the liquid crystal panel 201 represent the image 700 displayed on the liquid crystal panel 201. Accordingly, the image displayed on the liquid crystal panel 201 is projected forward of the liquid crystal panel 201 with the output light of the light source device 202.

The display control unit 203 includes a microcomputer including a Central Processing Unit (CPU) and a memory, for example. In other words, the display control unit 203 is realized by a computer (processor) including the CPU and the memory, and the computer, when the CPU executes a computer program stored in the memory, functions as the display control unit 203. The computer program is stored in the memory of the computer for the display control unit 203, but at least part of them can be provided through a telecommunication network such as the Internet or a non-transitory recording medium such as a memory card.

According to the image display system 10 configured as described above, it is possible to correct the display position of the virtual image 300 in the target space 400 in response to the orientation change of the body unit 1 with a less delay time for displaying the image 700 corresponding to the virtual image 300 and with a less restriction on the drawable area for drawing the image 700. Specifically, according to the image display system 10, the correction processing of correcting the display position of the virtual image 300 in the target space 400 according to the orientation change of the body unit 1 includes the first correction processing addressing the first orientation change of the body unit 1 and the second correction processing addressing the second orientation change of the body unit 1 which are performed separately. Accordingly, the second correction processing required to be performed in real time basis can be performed in a processing stage capable of reducing the display delay caused by the second correction processing, while the first correction processing which is not necessarily performed in real time basis can be performed in another processing stage in which the drawable area of the image 700 is less likely to be restricted by the first correction processing.

(3) Details of the Correction Processing by the Drawing Unit (i.e., the Correction Processing of the First Correction Unit)

The correction processing by the drawing unit 24 (i.e., the correction processing of the first correction unit 41) will be described in detail with reference to FIG. 5A to FIG. 6B.

Figure 5A:
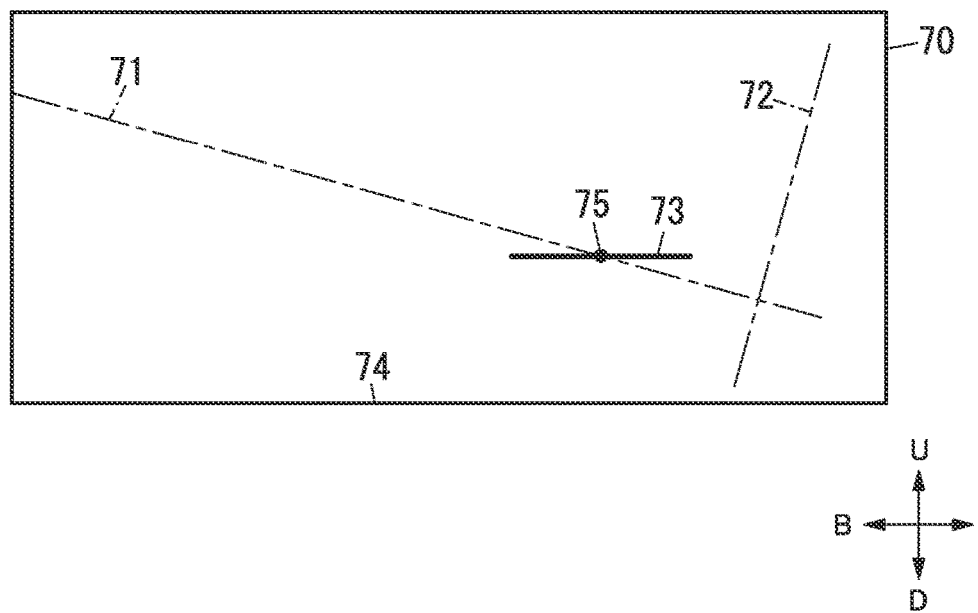
FIG. 5A is a conceptual view illustrating a rendering method of an image in a three-dimensional virtual space in a case where no orientation change occurs in a body unit.

It is explained first is a drawing method of drawing the image 700 by the drawing unit 24. In the drawing unit 24, the drawing main unit 241 is configured to draw the image 700. As shown in FIG. 5A, the drawing main unit 241 has a three-dimensional virtual space 70 for drawing the image 700. The three-dimensional virtual space 70 is configured to be set in a storage device provided in the drawing main unit 241.

The three-dimensional virtual space 70 corresponds to the target space 400. There are a virtual optical axis 71, a projection plane 72, a virtual road surface 74, and a predetermined position 75 set in the three-dimensional virtual space 70. The virtual axis 71, the projection plane 72, the virtual road surface 74, and the predetermined position 75 correspond to the optical axis 500, the imaginary surface 501, the road surface 600, and the predetermined position 401 in the target space 400, respectively. The projection plane 72 is substantially perpendicular to the virtual axis 71.

As shown in FIG. 5A, the drawing main unit 241 is configured to render a three-dimensional image 73 corresponding to the image 700 in the three-dimensional virtual space 70. The three-dimensional image 73 is positioned at the predetermined position 75 within the three-dimensional virtual space 70 so that a prescribed positional relation between the three-dimensional image 73 and the virtual road surface 74 (for example, they are parallel to each other) is maintained. The drawing main unit 241 is further configured to project the rendered three-dimensional image 73 onto the projection plane 72 in the three-dimensional virtual space 70 to form a two-dimensional image. The resultant two-dimensional image serves as the image 700.

Figure 5B:
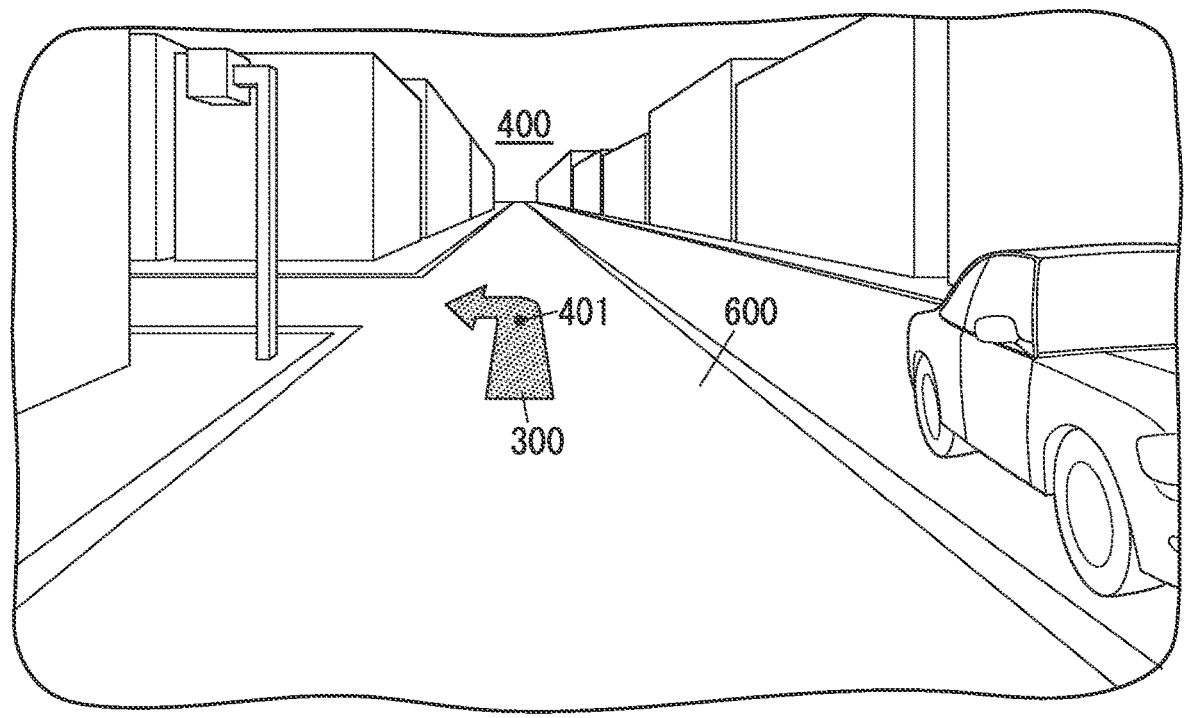
FIG. 5B is a conceptual view of a field of view of a driver in the case where no orientation change occurs in the body unit.

In a case where there is no orientation change in the automobile 100, the virtual image 300 corresponding to the image 700 drawl as described above is displayed at the predetermined position 401 (the position where the arrow overlaps with the road in the intersection), as shown in FIG. 5B.

When the first orientation change occurs in the body unit 1, the line of the user's 200 sight moves upward for example, as a result the real scene seen by the user 200 moves relatively downward, for example. This causes the virtual image 300 to be displayed at a position above the intersection in the target space 400 (see "300X" in FIG. 6B).

Figure 6A:
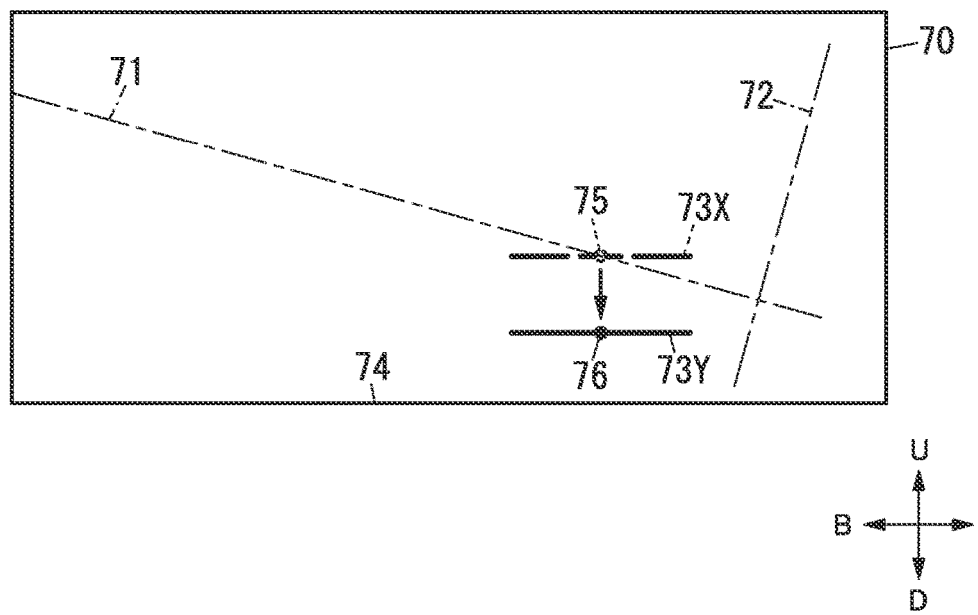
FIG. 6A is a conceptual view illustrating a rendering method of an image in a three-dimensional virtual space in a case where a first orientation change occurs in the body unit.

When the first orientation change occurs in the body unit 1 as described above, the drawing main unit 241 corrects the display position of the virtual image 300 by drawing the image 700 so that the misalignment of the virtual image 300 with respect to the real scene caused by the first orientation change of the body unit 1 is compensated. Specifically, the drawing main unit 241 renders the three-dimensional image 73 within the three-dimensional virtual space 70 so that the misalignment of the virtual image 300 with respect to the real scene caused by the first orientation change of the body unit 1 can be compensated by rendering the three-dimensional image at a position 76 displaced downward from the predetermined position 75 (see FIG. 6A). In FIG. 6A, the three-dimensional image before the correction is designated by a reference sign "73X", and the three-dimensional image after the correction is designated by a reference sign "73Y".

Figure 6B:
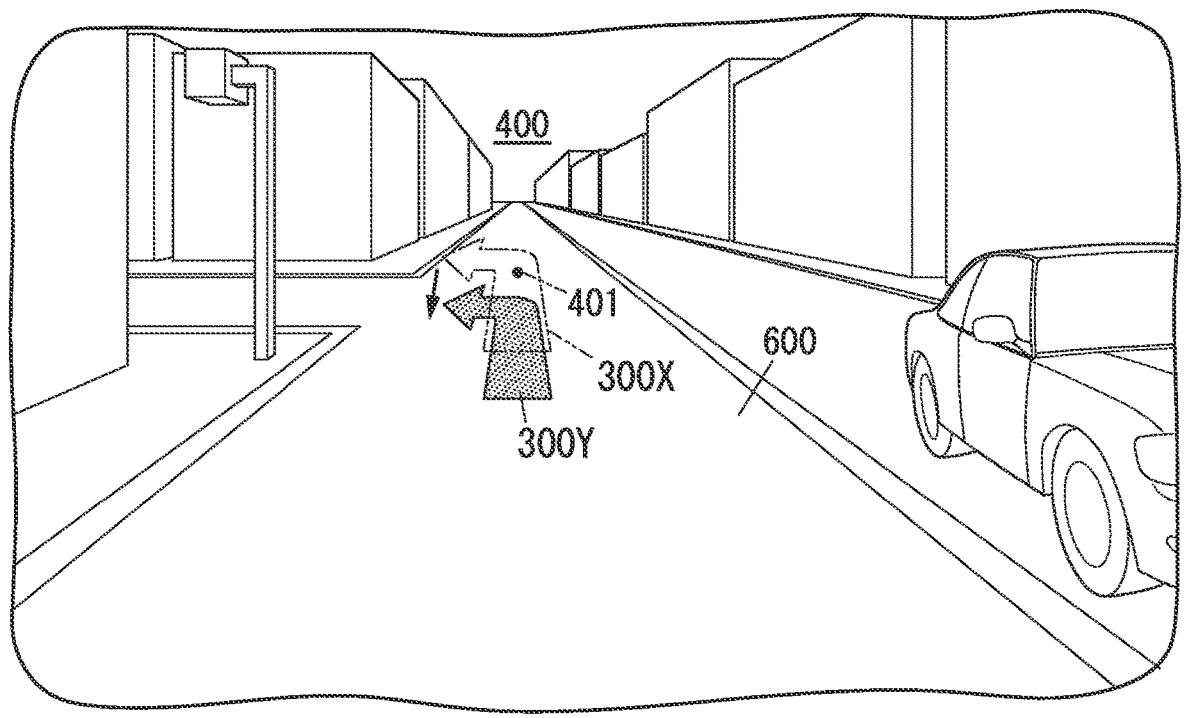
FIG. 6B is a conceptual view of a field of view of a driver in the case where the first orientation change occurs in the body unit.

The drawing main unit 241 then projects the rendered (corrected) three-dimensional image 73Y onto the projection plane 72 in the three-dimensional virtual space 70 to form a two-dimensional image. The resultant two-dimensional image serves as a corrected image 700. A virtual image 300Y corresponding to the corrected image 700 is displayed at a position (a position where the arrow overlaps with the road in the intersection) displaced downward from the predetermined position 401 in the target space 400, as shown in FIG. 6B. In FIG. 6B, the pre-corrected virtual image is designated by a reference sign "300X", and the corrected virtual image is designated by a reference sign "300Y".

(4) Details of the Correction Processing by the Vibration Distortion Correction Unit (i.e., the Correction Processing of the Second Correction Unit)

The correction processing by the vibration distortion correction unit 253 (i.e., the correction processing of the second correction unit 42) will be described in detail with reference to FIG. 7, FIG. 8A and FIG. 8B.

Figure 7:
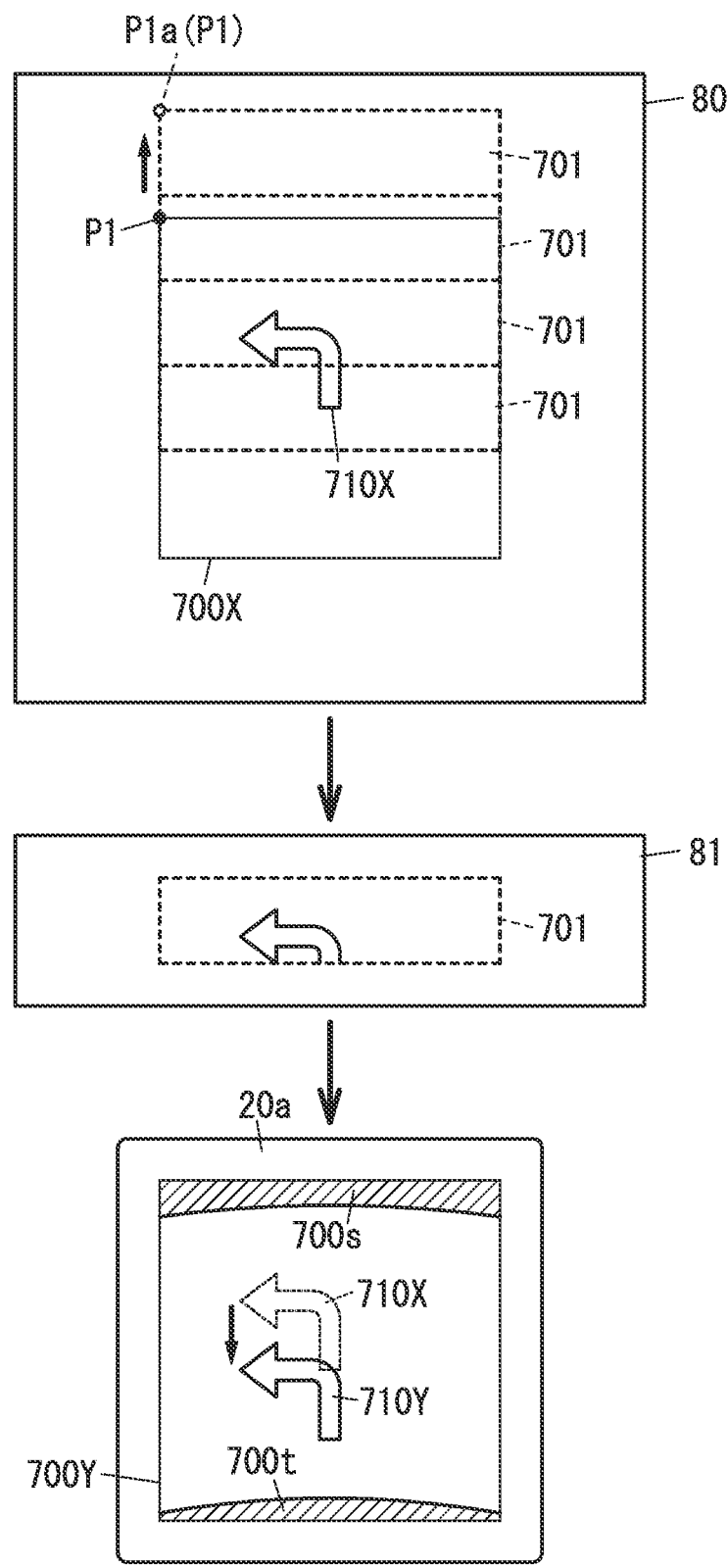
FIG. 7 is a conceptual view illustrating a method for performing a vibration correction processing and a distortion correction processing.

In FIG. 7, the image and an arrow inside the image before being subjected to the vibration correction processing and the distortion correction processing are designated by reference signs "700X" and "710X", respectively. In FIG. 7, the image and an arrow inside the image after being subjected to the vibration correction processing and the distortion correction processing are designated by reference signs "700Y" and "710Y", respectively.

The vibration distortion correction unit 253 is configured to perform the vibration correction processing on the image 700 output from the output buffer 252, and subsequently perform the distortion correction processing on the resultant image. The vibration correction. processing and the distortion correction processing are performed sequentially in this order. The vibration correction processing corrects the misalignment of the virtual image 300 with respect to the real scene, which is caused by the second orientation change of the body unit 1. The distortion correction processing corrects the distortion of the virtual image 300 caused by the reflection of light by the windshield 101 and the projection unit 3.

As shown in FIG. 7, the vibration distortion correction unit 253 includes a drawing buffer 80 and a line buffer 81.

The drawing buffer 80 is configured to temporarily store the image 700 output from the output buffer 252. According to the drawing buffer 80, a readout start point P1 for reading out the image 700 from the drawing buffer 80, from which an image is read out, can be changed (can be set at a desired point). In an example where the readout start point P1 is set to an upper left corner (a reference point), read out from the drawing buffer 80 is an image having one screen size and read out from the upper left corner as the reference point. In this case, the readout image 700 can be read out with no displacement in its layout.

In another example where the readout start point P1 is set to a point P1a which is displaced upward from the upper left corner of the image 700, read out from the drawing buffer 80 is an image having the one screen size but read out from the readout start point P1 as the reference point. In this case, the readout image 700 has a layout displaced downward, as a result of the readout start point displaced upward. Accordingly, the image 700Y is displayed on the display surface 20a so that the arrow 710 in the image 700Y is displaced downward. Note that in yet another example where the readout start point P1 is set to a point displaced downward from the upper left corner of the image 700, the image is displayed on the display surface 20a so that the arrow 710Y in the image 700Y is displaced upward.

The image 700 is read out from the drawing buffer 80 on a sub-area image 701 basis (one sub-area image by one sub-area image), wherein each sub-area image 701 is an image area including some pixel lines. Note that the image 700 having the one screen size is constituted by a collection of the sub-area images 701.

The line buffer 81 includes a storage device configured to store the sub-area image 701 which is an image area including some pixel lines. The line buffer 81 is configured to temporarily store the sub-area image 701 read out from the drawing buffer 80, and to allow the sub-area image 701 subject to the distortion processing to be output to the display control unit 203 on a basis of an image having one pixel line (one pixel line image by one pixel line image).

The vibration distortion correction unit 253 is configured to temporarily store the image 700X output from the output buffer 252 in the drawing buffer 80. The vibration distortion correction unit 253 is configured to read out the image 700X stored in the drawing buffer 80 from a designated readout start point P1 on the sub-area image 701 basis, and to temporarily store the readout sub-area image 701 in the line buffer 81. The vibration distortion correction unit 253 is further configured to perform the distortion correction processing on the sub-area image 701 stored in the line buffer 81, and read out the sub-area image 701 from the line buffer 81 and output it to the display unit 20 on a basis of an image having one pixel line, where a collection of the images having one pixel line constitutes the sub-area image 701. As a result, the image 700Y subjected to the vibration correction processing and the distortion correction processing is displayed in the display unit 20.

The vibration distortion correction unit 253 is configured to detect, based on the second orientation signal from the vibration sensor 5, the angle of pitch of the body unit 1 caused by the second orientation change, and to change (adjust) the readout start point P1 to compensate the misalignment of the virtual image 300 with respect to the real scene according to the angle of pitch. In an case where the angle of pitch corresponds to the backward inclination of the body unit 1, the readout start point P1 is changed to the point P1a positioned above the upper left corner of the image 700 so that the virtual image 300 is displayed to a position lower than the predetermined position 401 in the target space 400. The vibration correction processing is realized by this processing that the image 700 is read out from the changed readout start point P1a. As a result, the display position of the arrow 710Y of the corrected image 700Y in the display unit 20 is corrected (adjusted) to the position lower than the display position of the arrow 710X of pre-corrected image 700X. Accordingly, the misalignment of the virtual image 300 with respect to the real scene caused by the vibration of the body unit 1 can be compensated.

It should be noted that, when the readout start point P1 is changed to a position displaced from the upper left corner of the image 700, the readout image 700 may include a blank region 700s having no image due to displacement in the layout of the image 700. This blank region 700s may be displayed as a black image, for example. Furthermore, a blank region having no image may be generated as a result of the distortion correction processing in some cases. The blank region 700t in this case may also be displayed as a black image.

The vibration distortion correction processing is performed at a stage later than the output buffer 252 and before the display unit 20, as described above. This can reduce the display delay in the display unit 20. According to the distortion correction processing performed on the image 700, the image 700 is read out from the drawing buffer 80 to the line buffer 81 on the sub-area image 701 basis, and the distortion correction processing is performed on the sub-area image 701 basis as well, and then the resultant image is output to the display unit 20. This can reduce the delay of time for outputting the image from the line buffer 81 to the display unit 20, and as a result can further reduce the display delay in the display unit 20.

Figure 8:
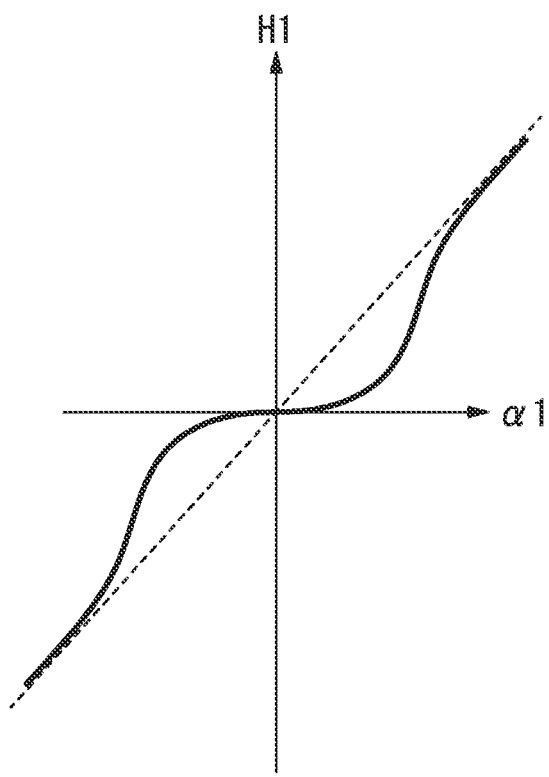
FIG. 8 shows a graph illustrating an example of a relation between a change amount (vibration amount) and a correction amount according to the vibration correction processing.

In the vibration correction processing, the correction amount (amount of misalignment) H1 for correcting the display position of the image 700 may vary non-linearly with respect to the magnitude of the change amount (angle of pitch) $\alpha 1$ in the second orientation change of the body unit 1. In this case, as shown in FIG. 8, the correction amount H1 varies according to the magnitude of the change amount $\alpha 1$. When the change amount $\alpha 1$ is smaller than a predefined value (namely, when the change amount al is comparatively small), the correction amount H1 may be comparatively small or may be zero (substantially zero). When the change amount $\alpha 1$ is larger than or equal to a predefined value, the correction amount H1 may be proportional to the change amount $\alpha 1$. With this configuration, the vibration correction processing may not be performed when the change amount $\alpha 1$ according to the second orientation change of the body unit 1 is comparatively small, and the vibration correction processing may be formed when the change amount al according to the second orientation change of the body unit 1 is comparatively large. For example, the display position of the virtual image 300 may not be corrected in a case where the body unit 1 installed in the automobile 100 vibrates due to idling of an engine. Note that the correction amount H1 may be proportional to the change amount $\alpha 1$ with respect to a whole range of the change amount $\alpha 1$.

In the example described above, the second orientation change of the body unit 1 corresponds to the change according to a pitch direction of the automobile 100, but is not limited thereto. Additionally or alternatively, the second orientation change of the body unit 1 may be a change according to a yaw direction of the automobile 100. In this case, the readout start point P1 may be changed to a left side or a right side according to the angle of yaw of the automobile 100. As a result, the image 700 is displayed in the display unit 20 so that the display position of the arrow 710 in the corrected image 700 is displaced in the left side or right side from the position of the arrow 710 in the pre-corrected image 700. Additionally or alternatively, the second orientation change may be a change according to a roll direction. In this case, the image 700 is read out so that it is rotated according to an angle of roll with respect to the readout start point P1. Accordingly, the image 700 is displayed in the display unit 20 so that the display position of the arrow 710 in the corrected image 700 is rotatably displaced from the position of the arrow 710 of the pre-corrected image 700. Note that the yaw direction is a direction around an axis running up and down of the automobile 100, and the angle of yaw is an angle of rotation of the yaw direction. The roll direction is a direction around an axis running from the front to the back of the automobile 100, and the angle of roll is an angle of rotation of the roll direction.

In the explanation described above, the distortion correction processing is performed on the sub-area image 701 basis, but is not limited thereto. For example, the distortion correction processing may be performed on the image 700 basis. In this case, the line buffer 81 may be replaced with a drawing buffer capable of temporarily storing the image having one screen size, and the distortion correction processing may be performed on the drawing buffer.

(5) Variations

The above embodiment is merely one example of various embodiments of the present disclosure. The above embodiment may be modified in various ways in accordance with design or the like as it can achieve the object of the present disclosure. Furthermore, aspects of the above embodiment are not limited to be realized in a form of the image display system alone. For example, some aspects of the above embodiment may be realized in a form of a movable object including the image display system 10, an image display method employing the image display system 10, or the like. Some aspects of the above embodiment may be realized in a form of a computer program which when executed by a computer causes the computer to perform the above image display method, a non-transitory recording medium storing the above computer program, or the like. Variations and the above embodiment can be appropriately combined.

In the above embodiment, a single vibration sensor 5 is used to detect both of the first orientation change and be second orientation change of the body unit 1, and the two filters 6 and 7 are used to distinguish the first orientation change and the second orientation change to generate individual orientation signal, but the present embodiment is not limited thereto. For example, the vibration sensor 5 may be replaced with two sensors, a first vibration sensor (first detection unit) and a second vibration sensor (second detection unit). The first vibration sensor is configured to detect the first orientation change of the body unit 1 and to output the first orientation signal indicative of the detected first orientation change. The second vibration sensor is configured to detect the second orientation change of the body unit 1 and to output the second orientation signal indicative of the detected second orientation change. In this case, the low-pass filter 6 and the high-pass filter 7 may be omitted.

The projection unit 3 is not particularly limited to as long as it includes at least an optical element. The projection unit 3 is not limited to include the two mirrors, the first mirror 31 and the second mirror 32, but may include a single mirror alone or three or more mirrors. The projection unit 3 may include an optical element other than the mirror, such as a lens.

The image display system 10 is not limited to form the virtual image 300 in the target space 400 set in front of the automobile 100 according to the traveling direction, but may be configured to form the virtual image 300 in a back of, in a side of, or above the automobile 100 according to the traveling direction.

The image display system 10 is not limited to be employed as the head-up display for the automobile 100, but may be employed for another movable object body other than the automobile 100, such as a motorcycle, a train, an air-plane, a construction machinery, a ship or a boat, and the like. The image display system 10 is not limited to be employed in the movable object, but may be employed in an amusement machine or the like, for example. The image display system 10 may also be employed as a wearable appliance such as a Head Mounted Display (HMD), a medical machine, a stationary device, or the like. The image display system 10 may be incorporated in a device such as a digital camera to function as an electronic viewfinder.

In the present embodiment, the drawing unit 24, the correction unit 25, and the display control unit 203 are realized by individual CPUs and memories, but the drawing unit 24, the correction unit 25, and the display control unit 203 may be realized by a single CPU and a single memory. Any two of the drawing unit 24, the correction unit 25, and the display control unit 203 may be realized by a single CPU and a single memory.

The drawing unit 24 may be realized by a Graphics Processing Unit (GPU) in place of the CPU. The correction unit 25 may be realized by a Field-Programmable Gate Array (FPGA) in place of the CPU.

In the present embodiment, the vibration distortion correction unit 253 (i.e., the correction unit 25) serves as the correction unit configured to perform the correction processing addressing the second orientation change of the body unit 1, but is not limited thereto. For example, the vibration distortion correction unit 253 may serve as a correction unit configured to perform a correction processing addressing a whole orientation change of the body unit 1 (in other words, an orientation change not separated to the first orientation change and the second orientation change).

Figure 9:
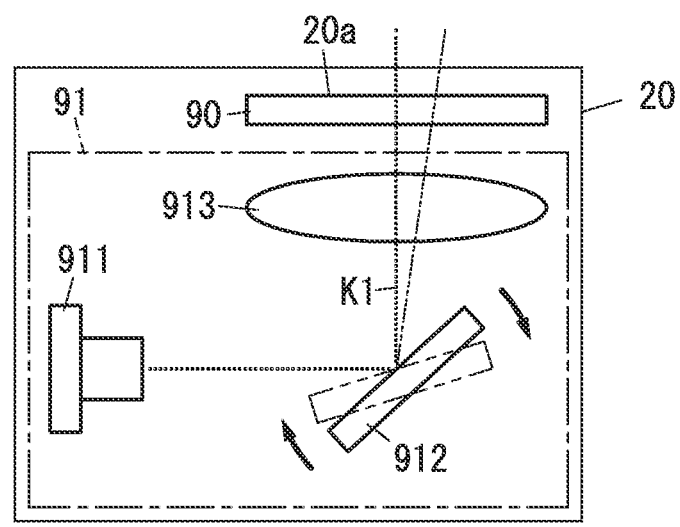
FIG. 9 is a conceptual view illustrating a variation of a display unit.

In the above embodiment, the display unit 20 includes the liquid crystal panel 201, but is not limited thereto. Alternatively, a display unit 20 may be configured to form an image 700 by scanning a display surface 20a with a laser beam striking from a back of the display surface 20a of the display unit 20, as shown in FIG. 9.

Specifically; the display unit 20 includes a diffusively transmissive screen 90, a light emitter 91 configured to emit light to the screen 90 from a back side of the screen 90. The light emitter 91 is a scanning type light emitting unit, and is configured to emit light K1 to the screen 90. The front surface or the back surface (the front surface, in this example) of the screen 90 serves as the display surface 20a, and the image 700 is drawn by the light K1 emitted from the light emitter 91. As a result, the virtual image 300 (see FIG. 2) is formed in the target space 400 with the light K1 passing through the screen 90.

The light emitter 91 includes a light source 911 configured to produce the light (laser beam, for example) K1, a scanning unit 912 for scanning of the light K1 of the light source 911, and a lens 913. The light source 911 includes a laser module configured to emit the light K1. The scanning unit 912 is configured to reflect the light K1 of the light source 911 toward the screen 90 through the lens 913. The scanning unit 912 is configured to change the direction of the reflection of the light K1, and to thereby cause the light K1 to run on the display surface 20a of the screen 90 to scan the display surface 20a. The scanning unit 912 can realize a Raster Scan of two-dimensional scanning with the light K1 horizontally and vertically on the display surface 20a. The scanning unit 912 is configured to scan the display surface 20a by moving a bright spot thereon to form a two-dimensional image (the image 700, for example) on the display surface 20a. The bright spot may be a point at which the ray of light K1 crosses with the display surface 20a of the screen 90. The scanning unit 912 includes a micro scanning mirror manufactured by Micro Electro Mechanical Systems (MEMS) techniques, for example. The scanning unit 912 includes a rotatable optical element (mirror) for reflecting the light K1, and reflects the light K1 of the light source 911 toward a direction according to a rotation angle (deflection angle) of the optical element. The scanning unit 912 scans the light K1 of the light source 911 accordingly. The scanning unit 912 realizes the Raster Scan in which scanning is performed two-dimensionally with the light K1 by rotating the optical element about two axes perpendicular to each other, for example.

Aspects

An image display system (10) of a first aspect includes an image producing unit (21), a display unit (22), a projection unit (3), and a body unit (1). The image producing unit (21) is configured to produce an image (700). The display unit (20) is configured to display the image (700) produced by the image producing unit (21). The projection unit (3) is configured to project, in a target space (400), a virtual image (300) corresponding to the image (700) with an output light of the display unit (20). The display unit (22) and the projection unit (3) are provided to the body unit (1). The image producing unit (21) includes a first correction unit (41) and a second correction unit (42). The first correction unit (41) is configured to perform a first correction processing of correcting, based on a first orientation signal, a display position of the virtual image (300) in the target space (400). The first orientation signal is indicative of a first orientation change of the body unit (1). The second correction unit (42) is configured to perform a second correction processing of correcting, based on a second orientation signal, the display position of the virtual image (300) in the target space (400). The second orientation signal is indicative of a second orientation change of the body unit (1). A change rate of the second orientation change is faster than that of the first orientation change. The second correction processing is performed at a timing different from a timing at which the first correction processing is performed.

Preferably, the image display system is installed in a movable object. Preferably, the body unit exhibits an orientation change in response to a vibration (an acceleration) acting on the movable object, the orientation change including a first orientation change and a second orientation change of which change rate is faster than that of the first orientation change.

With this configuration, it is possible to correct the display position of the virtual image (300) in the target space (400) in response to the orientation change of the body unit (1) with a less delay time for displaying the image (700) corresponding to the virtual image (300) and with a less restriction on the drawable area for drawing the image (700). Specifically, the correction processing of correcting the display position of the virtual image (300) in the target space (400) according to the orientation change of the body unit (1) includes a first correction processing and a second correction processing which are performed separately. The first correction processing addresses the first orientation change of the body unit (1). The second correction processing addresses the second orientation change of the body unit (1). A change rate of the second orientation change is faster than that of the first orientation change. The second correction processing is performed at a timing different from a timing at which the first correction processing is performed by the first correction unit (41). Accordingly, the second correction processing required to be performed in real time basis can be performed in a processing stage capable of reducing the display delay caused by the second correction processing. The first correction processing which is not necessarily performed in real time basis can be performed in another processing stage in which the drawable area of the image 700 is less likely to be restricted by the first correction processing.

In an image display system (10) of a second aspect, which may be realized in combination with the first aspect, the second correction unit (42) is configured to perform, on the image (700), a distortion correction processing in addition to the second correction processing.

With this configuration, the second correction unit (42) also serves as a correction unit for performing the distortion correction processing. It is accordingly possible to perform the second correction processing and the distortion correction processing together, leading to improvement of processing efficiency.

In an image display system (10) of a third aspect, which may be realized in combination with the first or second aspect, the second correction unit (42) includes a buffer (252) and a correction main unit (253). The buffer (252) is configured to store therein the image (700). The correction main unit (253) is configured to perform the second correction processing on the image (700) stored in the buffer (252), and to output, to the display unit (20), the image (700) on which the second correction processing is performed.

With this configuration, the second correction processing is performed at a stage later than the buffer (252) and before the display unit (20). This can further reduce the display delay in the display unit (20) caused by the second correction unit.

An image display system (10) of a fourth aspect, which may be realized in combination. with any one of the first to third aspects, further includes a first detection unit (5, 6) and a second detection unit (5, 7). The first detection unit (5, 6) is configured to output the first orientation signal. The second detection unit (5, 7) is configured to output the second orientation signal.

With this configuration, it is possible to provide an image display system including the first detection unit (5, 6) configured to output the first orientation signal and the second detection unit (5, 7) configured to output the second orientation signal.

In an image display system (10) of a fifth aspect, which may be realized in combination with the second aspect, the distortion correction processing is performed after the second correction processing is performed.

In an image display system (10) of a sixth aspect, which may be realized in combination with the third aspect, the correction main unit (253) includes a drawing buffer (80) and a line buffer (81). The drawing buffer (80) is configured to store therein the image (700) which has one screen size and is output from the buffer (252). The line buffer (81) is configured to store therein an image read out from the drawing buffer (80). The drawing buffer (80) is configured such that, when the image (700) stored in the drawing buffer is read out therefrom, an image having the one screen size and defined by a readout start point is read out on a sub-area image (701) basis, wherein a collection of a plurality of the sub-area images (701) constitutes the image having the one screen size. The line buffer (81) is configured to store the sub-area image (701) read out from the drawing buffer (80), and to allow the sub-area image (701) on which a distortion processing is performed to be output to the display unit (20) on one pixel line basis. The drawing buffer (80) is configured to detect, based on the second orientation signal, the second orientation change of the body unit (1), and to change the readout start point so as to compensate a misalignment of the virtual image with respect to a real scene by the detected second orientation change, to perform the second correction processing.

An image display system (10) of a seventh aspect, which may be realized in combination with the fourth aspect, includes a vibration sensor (5), a low-pass filter (6), and a high-pass filter (7). The vibration sensor (5) is configured to detect a vibration acting on the body unit (1). The low-pass filter (6) is configured to allow a signal component having a frequency lower than the first frequency, of a signal output from the vibration sensor (5), to pass therethrough, and not to allow a signal component having a frequency higher than or equal to a first frequency, of the signal, to pass. The high-pass filter (7) is configured to allow a signal component having a frequency higher than or equal to the second frequency, of the signal output from the vibration sensor (5), to pass therethrough, and not to allow a signal component having a frequency lower than a second frequency, of the signal to pass. The first detection unit (5, 6) includes the vibration sensor (5) and the low-pass filter (6). The second detection unit (5, 7) includes the vibration sensor (5) and the high-pass filter (7).

In an image display system (10) of an eighth aspect, which may be realized in combination with the first aspect, the image producing unit (21) includes a drawing main unit (241). The drawing main unit (241) is configured to produce the image (700), and correct the image (700) based on the first orientation signal to compensate a misalignment of the virtual image (300) with respect to a real scene, which is caused by the first orientation change of the body unit (1). The drawing main unit (241) includes the first correction unit (41).

In an image display system (10) of a ninth aspect, which may be realized in combination with the eighth aspect, the drawing main unit (241) includes a storage device in which a three-dimensional virtual space (70) is set. The three-dimensional virtual space (70) corresponds to the target space (400). The drawing main unit (241) is configured to produce the image (700) by rendering a three-dimensional image (73) corresponding to the image (700) within the three-dimensional virtual space (70) and projecting the three-dimensional image (73) onto a projection plane (72) in the three-dimensional virtual space (70). The drawing main unit (241) is configured to, when the first orientation change occurs in the body unit (1), correct the display position of the virtual image (300) by correcting the three-dimensional image (73) to compensate a misalignment of the virtual image (300) with respect to a real scene, which is caused by the first orientation change of the body unit (1).

In an image display system (10) of an tenth aspect, which may be realized in combination with the first aspect, the display unit (20) is configured to scan the display surface (21a) with a laser beam to form the image (700), the laser beam striking from a back of the display surface (20a) of the display unit (20).

In an image display system (10) of an eleventh aspect, which may be realized in combination with the tenth aspect, the display unit (20) includes a screen (90), and a light emitter (91). The light emitter (91) is configured to emit light of the laser beam to the screen (90) to project the virtual image (300) toward the target space (400) with the light (K1) passing through the screen (90).

In an image display system (10) of a twelfth aspect, which may be realized in combination with the first aspect, the second correction unit (42) is configured to, in the second correction processing, determine a correction amount for correcting a display position of the image (700) produced by the image producing unit (21), and the correction amount varies non-linearly according to a magnitude of a change amount (α1) of the second orientation change of the body unit (1).

In an image display system (10) of a thirteenth aspect, which may be realized in combination with the twelfth aspect, the second correction unit (42) is configured to determine the correction amount (H1) to substantially zero when the change amount (α1) is smaller than a predefined value, and the correction amount (H1) varies linearly according to the change amount (α1) larger than or equal to a predefined value.

In an image display system (10) of a fourteenth aspect, which may be realized in combination with the twelfth aspect, the second orientation change includes a change in an orientation of the body unit (1) according to a pitch direction, a yaw direction, or a roll direction of the body unit (1).

A movable object of a fifteenth aspect includes the image display system (10) of any one of the first to fourteenth aspects, and a movable object body (100) in which the image display system (10) is installed.

In a movable object of a sixteenth aspect, which may be realized in combination with the fifteenth aspect, the projection unit (3) is configured to project the image (700) displayed in the display unit (20) onto a windshield (101) of the movable object body (100) to form the virtual image (300) in the target space (400).

In a movable object of a seventeenth aspect, which may be realized in combination with the fifteenth aspect, the virtual image (300) indicates a driving assist information for assisting driving the movable object body (100). The driving assist information includes at least one of vehicle speed information, navigation information, pedestrian information, forward vehicle information, lane departure info a Ion, and vehicle condition information.

In a movable object of an eighteenth aspect, which may be realized in combination with the fifteenth aspect, the movable object body (100) is an automobile, a motorcycle, a train, a construction machinery, a ship or a boat.

An image display method of nineteenth aspect employs an image display system including a display unit (20), a projection unit (3), and a body unit (1). The display unit (20) is configured to display an image (700). The projection unit (3) is configured to project in a target space (400) a virtual image (300) corresponding to the image (700) with an output light of the display unit (20). The display unit (20) and the projection unit (3) are provided to the body unit (1). The image display method includes an image producing processing of producing the image (700) displayed on the display unit (20). The image producing processing includes a first correction processing and a second correction processing. The first correction processing is a processing of correcting, based on a first orientation signal, a display position of the virtual image (300) in the target space (400). The first orientation signal is indicative of a first orientation change of the body unit (1). The second correction processing is a processing of correcting, based on a second orientation signal, the display position of the virtual image (300) in the target space (400). The second orientation signal is indicative of a second orientation change of the body unit (1). A change rate of the second orientation change is faster than that of the first orientation change. The image display method performs the first correction processing and the second correction processing at different timings.

With this configuration, it is possible to correct the display position of the virtual image (300) in the target space (400) in response to the orientation change of the body unit (1) with a less delay time for displaying the image (700) corresponding to the virtual image (300) and with a less restriction on the drawable area for drawing the image (700). Specifically, the correction processing of correcting the display position of the virtual image (300) in the target space (400) according to the orientation change of the body unit (1) includes a first correction processing and a second correction processing which are performed separately. The first correction processing addresses the first orientation change of the body unit (1). The second correction processing addresses the second orientation change of the body unit (1). A change rate of the second orientation change is faster than that of the first orientation change. The second correction processing is performed at a timing different from a timing at which the first correction processing is performed by the first correction unit (41). Accordingly, the second correction processing required to be performed in real time basis can be performed in a processing stage capable of reducing the display delay caused by the second correction processing. The first correction processing which is not necessarily performed in real time basis can be performed in another processing stage in which the drawable area of the image 700 is less likely to be restricted by the first correction processing.

A non-transitory computer-readable medium of twentieth aspect records a computer program for instructing a computer system to execute an image display method employing an image display system (10). The image display system (10) includes an image display unit (20), a projection unit (3), and a body unit (1). The display unit (20) is configured to display an image (700). The projection unit (3) is configured to project in a target space (400) a virtual image (300) corresponding to the image (700) with an output light of the display unit (20). The display unit (20) and the projection unit (3) are provided to the body unit (1). The image display method includes an image producing processing of producing the image (700) displayed on the display unit (20). The image producing processing includes a first correction processing and a second correction processing. The first correction processing is a processing of correcting, based on a first orientation signal, a display position of the virtual image (300) in the target space (400). The first orientation signal is indicative of a first orientation change of the body unit (1). The second correction processing is a processing of correcting, based on a second orientation signal, the display position of the virtual image (300) in the target space (400).

The second orientation signal is indicative of a second orientation change of the body unit (1). A change rate or the second orientation change is faster than that of the first orientation change. The image display method performs the first correction processing and the second correction processing at different timings.

The computer-readable medium with this configuration allows a general computer system to correct the display position of the virtual image (300) in the target space (400) in response to the orientation change of the body unit (1) with a less delay time for displaying the image (700) corresponding to the virtual image (300) and with a less restriction on the drawable area for drawing the image (700).

While various embodiments have been described herein above, it is to be appreciated that various changes in form and detail may be made without departing from the spirit and scope of the present disclosure presently or hereafter claimed.

The entire contents of Japanese Patent Application No. 2018-053557 mentioned above are incorporated by reference.

What is claimed is:

1. An image display system, comprising:
an image generator that produces an image corresponding to a virtual image projected in a target space;
a display that displays the image produced by the image generator; and
a body to which the display is provided, wherein:
the image generator includes a first corrector that performs a first correction processing of correcting the display position of the virtual image in the target space, based on a first orientation signal,
the first orientation signal is indicative of a first orientation change,
the first corrector includes:
a buffer that stores the image; and
a main corrector that performs the first correction processing on the image stored in the buffer, and outputs, to the display, the image on which the first correction processing is performed,
the main corrector includes:
a drawing buffer that stores therein the image which has one screen size and is output from the buffer, and
a line buffer that stores therein an image read out from the drawing buffer,
when the image stored in the drawing buffer is read out therefrom, an image having the one screen size and defined by a readout start point is read out on a sub-area image basis, and a collection of a plurality of the sub-area images constitutes the image having the one screen size,
the line buffer stores the sub-area image read out from the drawing buffer, and provides for the sub-area image on which a distortion processing is performed to be output to the display on one pixel line basis, and
the drawing buffer detects the first orientation change of the body based on the first orientation signal, and changes the readout start point so as to compensate a misalignment of the virtual image with respect to a real scene by the detected first orientation change, to perform the first correction processing.

2. The image display system of claim 1, further comprising:
a second corrector that performs a second correction processing of correcting a display position of the virtual image in the target space, based on a second orientation signal, wherein:
the second orientation signal is indicative of a second orientation change of the body, and
the first orientation signal is indicative of the first orientation change of the body of which change rate is faster than that of the second orientation change.

3. The image display system of claim 2, wherein:
the image generator includes a main drawer that produces the image and correct the image based on the second orientation signal to compensate a misalignment of the virtual image with respect to a real scene, which is caused by the second orientation change of the body, and
the main drawer includes the second corrector.

4. The image display system of claim 3, wherein:
the main drawer includes a storage device in which a three-dimensional virtual space corresponding to the target space is set, and
the main drawer:
produces the image by rendering a three-dimensional image corresponding to the image within the three-dimensional virtual space and projecting the three-dimensional image onto a projection plane in the three-dimensional virtual space, and,
when the second orientation change occurs in the body, corrects the display position of the virtual image by correcting the three-dimensional image to compensate a misalignment of the virtual image with respect to a real scene, which is caused by the second orientation change of the body.

5. The image display system of claim 1, wherein:
the first corrector performs, on the image, a distortion correction processing in addition to the first correction processing.

6. The image display system of claim 5, wherein:
the distortion correction processing is performed after the first correction processing is performed.

7. The image display system of claim 1, further comprising:
a first detector that outputs the first orientation signal; and
a second detector that outputs the second orientation signal.

8. The image display system of claim 7, further comprising:
a vibration sensor that detects a vibration acting on the body;
a high-pass filter which:
allows a signal component having a frequency higher than or equal to the first frequency of the signal output from the vibration sensor to pass therethrough, and
does not allow a signal component having a frequency lower than a first frequency of the signal to pass, and a low-pass filter which:
  allows a signal component having a frequency lower than the second frequency of a signal output from the vibration sensor to pass therethrough, and
  does not allow a signal component having a frequency higher than or equal to a second frequency, of the signal, to pass, wherein:
the first detector includes the vibration sensor and the high-pass filter, and
the second detector includes the vibration sensor and the low-pass filter.

9. The image display system of claim 1, wherein:
the display scans the display surface with a laser beam to form the image, and
the laser beam strikes from a back of the display surface of the display.

10. The image display system of claim 9, wherein:
the display includes:
  a screen, and
  a light emitter that emits light of the laser beam to the screen to project the virtual image toward the target space with the light passing through the screen.

11. The image display system of claim 1, wherein:
the first corrector, in the first correction processing, determines a correction amount for correcting a display position of the image produced by the image generator, and
the correction amount varies non-linearly according to a magnitude of a change amount of the second orientation change of the body.

12. The image display system of claim 11, wherein:
the first corrector determines the correction amount to substantially zero when the change amount is smaller than a predefined value, and the correction amount varies linearly according to the change amount larger than or equal to a predefined value.

13. The image display system of claim 11 wherein:
the first orientation change includes a change in an orientation of the body according to a pitch direction, a yaw direction, or a roll direction of the body.

14. The image display system of claim 1, wherein:
the first corrector includes:
  an image corrector which performs a color compensation processing on the image output from the drawing buffer, and
  an output buffer which stores the image output from the image corrector.

15. The image display system of claim 1, wherein:
the first corrector includes a vibration distortion corrector which stores the image output from the output buffer and read out the image stored in the drawing buffer from a designated readout start point on the sub-area image in the line buffer.

16. A movable object, comprising:
the image display system of claim 1; and
a movable object body in which the image display system is installed.

17. The movable object of claim 16, further comprising a projector that projects the image displayed in the display onto a windshield of the movable object body to form the virtual image in the target space.

18. The movable object of claim 16, wherein:
the virtual age indicates driving assistance information for assisting driving of the movable object body, and
the driving assistance information includes at least one of vehicle speed information, navigation information, pedestrian information, forward vehicle information, lane departure information, or vehicle condition information.

19. The movable object of claim 16, wherein the movable object body is an automobile, a motorcycle, a train, a construction machine, a ship or a boat.

* * * * *